United States Patent

[11] 3,629,486

[72] Inventors Christy Edward Selvanayagam Swampillai
Tadworth;
Derek Reginald Edwards, Windsor, both of
England
[21] Appl. No. 88,414
[22] Filed Nov. 10, 1970
[45] Patented Dec. 21, 1971
[73] Assignee British Insulated Callander's Cables
Limited
London, England
[32] Priority Nov. 19, 1969
[33] Great Britain
[31] 56,713/69

[54] GAS-INSULATED BUSBAR INSTALLATION
2 Claims, 3 Drawing Figs.
[52] U.S. Cl. .................................................. 174/16 B,
174/28, 174/99 B
[51] Int. Cl. ...................................................... H01b 9/06
[50] Field of Search ............................................ 174/28, 29,
16 B, 15 C, 99 B, 13, 84

[56] References Cited
UNITED STATES PATENTS
| | | | |
|---|---|---|---|
| 3,329,816 | 7/1967 | Grundhauser et al. | 174/28 UX |
| 3,391,243 | 7/1968 | Whitehead | 174/28 |
| 3,356,785 | 12/1967 | Yasuhisa Yoshida et al. | 174/28 |
| 2,678,428 | 5/1954 | Fiet | 174/28 |
| 2,861,119 | 11/1958 | Collonge | 174/16 |
| 3,448,202 | 6/1969 | Whitehead | 174/28 |

FOREIGN PATENTS
| | | | |
|---|---|---|---|
| 397,081 | 8/1933 | Great Britain | 174/28 |
| 410,854 | 6/1945 | Italy | 174/28 |

Primary Examiner—Lewis H. Myers
Assistant Examiner—A. T. Grimley
Attorney—Webb, Burden, Robinson & Webb ABSTRACT: In a gas-insulated isolated-phase bus bar installation suitable for transmitting electric power at a voltage of at least 22 kv. and a current of at least 1,000 A. comprising a tubular load-carrying conductor mounted coaxially within a tubular outer enclosure, a length of load-carrying conductor is mounted by a plurality of supports each comprising a control hub which adheres to the surface of the said tubular conductor, to a metal sleeve fitting into the said tubular conductor, or to a metal tube acting as a joint between lengths of the said tubular conductor. The shape of each spacer is such that the cross section of the hub in any plane at right angles to the conductor axis is substantially circular and its section in any plane passing through the conductor axis is substantially elliptical at each end of the hub, with the major axis of the ellipse lying on the inner surface of the hub and the minor axis of the ellipse lying on a radius of the conductor cross section and extending to substantially the maximum thickness of the end part of the hub. The ellipse may be a circle.

PATENTED DEC 21 1971

3,629,486

Inventor
CHRISTY EDWARD SELVANAYAGAM SWAMPILLAI
DEREK REGINALD EDWARDS

By
Attorney

GAS-INSULATED BUSBAR INSTALLATION

This invention relates to a gas-insulated bus bar installation for transmitting electric power at high voltages and heavy currents, that is to say at voltages of 22 kv. and above and currents of 1,000 amperes and above. MOre particularly it relates to an installation of this kind incorporating a bus bar or bus bars each comprising a tubular load carrying conductor mounted coaxially within a tubular outer enclosure and spaced therefrom by a dielectric consisting principally of an insulating gas, the remainder of the dielectric consisting of an insulating support or supports spacing the conductor from the enclosure. The gas will be at a pressure at least equal to and usually much higher than atmospheric pressure; a pressure of at least 1 $MN/m.^2$ (10 atmospheres) is preferred.

The principal object of the present invention is to provide a bus bar installation of this kind and bus bars and parts thereof for use in such installations, having improved electrical properties.

The bus bar of the present invention is of the kind in which the tubular conductor is supported coaxially within the outer tubular conductor by a series of supports of dielectric material spaced longitudinally one from the other.

In accordance with the invention the supports in a length of the bus bar each comprise a central hub which adheres to the surface of the tubular conductor, to a metal tube fitting onto the tubular conductor, to a metal tube acting as a joint between lengths of the tubular conductor, and this hub is so shaped that its cross section in any plane at right angles to the conductor axis is substantially circular and its section in any plane passing through the conductor axis is substantially elliptical at each end of the hub, with the major axis of the ellipse lying on the inner surface of the hub and the minor axis of the ellipse lying on a radius of the conductor cross section and extending to substantially the maximum thickness of the end part of the hub. The term "ellipse" as used herein includes an ellipse with its major and minor axes of equal length, i.e. a circle.

The preferred shape of spacer comprises a tubular hub of axial length greater than its diameter formed integrally with a central web extended generally in a plane at right angles to its axis. This web may support an outer concentric tubular part which is integral with the web but which has an axial length considerably shorter than the axial length of the hub, although it may be several times the thickness of the web.

The outer diameter of the outer tubular part is such that it makes a tight fit in the outer tubular enclosure of the bus bar. The ends of the hub are shaped, as defined above, so as to obtain an electrical stress distribution in the ends of the hub similar to that in the remainder of the hub, which is preferably a tube of uniform wall thickness.

The hub is preferably formed from a setting synthetic resin having appropriate electrical properties (e.g. an epoxy resin), by a vacuum casting method but other materials such as thermoplastics materials, ceramics, porcelains and rubbers can be used provided they have suitable dielectric properties. It can either be preformed and subsequently attached to the conductor or to a short length of tube which fits on to the conductor or forms a connector between two lengths of the conductor, by means of an adhesive, or cast in situ on the conductor or tube. When an adhesive is used it is preferably a synthetic resin containing a dispersed metal or other conductive powder.

The web is preferably formed with apertures to allow for free flow of gas along the annular space between the inner and outer tubular conductors of the bus bar and those apertures are preferably tapered or Venturi-shaped to minimize the resistance to flow of gas through the annular space. When the outer cylindrical surface of the spacer fits directly into the outer tubular enclosure, the peripheral surface of the spacer is preferably formed for stress grading purposes with a circumferential groove or grooves, each internally metallized in such a way that the boundaries of the metallized layer are spaced both from the ends of the spacers and from the outer conductor. Alternatively a thin metal, e.g. stainless steel, sleeve may be fitted around the spaced and attached thereto, for example by an adhesive, the axial length of the sleeve being greater than the axial length of the outer part of the spacer on to which it fits, the sleeve preferably being symmetrically arranged so that both of its ends project beyond the outer part of the spacer.

The metal sleeve may be a sliding fit in the outer tubular enclosure of the bus bar, and, to avoid the formation of gas cushions between the sleeve and the outer conductor, the projecting ends of the sleeve are preferably formed with apertures.

When, as is preferred, the spacers are preformed on, or secured by an adhesive to, short lengths of tubing which fit on to the inner tubular conductor or act as connectors between lengths of the inner conductor, each spacer and its length of tubing is preferably encapsulated immediately after manufacture in the factory, e.g. in a temporary outer sleeve which may be of a plastics material such as polyethylene. The encapsulator is removed during assembly of the bus bar.

When the spacer is provided with an outer metal sleeve this sleeve can form part of the encapsulation, but will remain on the spacer after assembly.

Whatever the form of spacer, after assembly in the outer tubular enclosure it may be firmly located therein by swaging down the outer enclosure onto the spacer.

Although the spacers are especially suitable for use in bus bar installations of the kind described in Reynolds and Hartshorn U.S. Pat. application Ser. No. 840,961 filed July 11, 1969, in which coolant gas is circulated under pressure through the tubular conductor independently of the means for maintaining the dielectric gas pressure they can also be used in installations in which the gas contained within the inner tubular conductor is not segregated from the gas in the annular space between the inner tubular conductors and the outer enclosures. In the latter case, the tubular conductor and if necessary the hub of the spacer or a tube on which the spacer is mounted, or both, may be formed with gas apertures so shaped and directed that any dust that has settled on the surfaces of the spacer can be removed by causing a rapid stream of gas to flow through such apertures from within the tubular conductor to the annular space, e.g. by applying a high gas pressure to the inner tubular conductor and evacuating the annular space between the inner and outer conductors.

Examples of spacers for use in accordance with the present invention are shown in the accompanying drawing in which.

Figure 1:
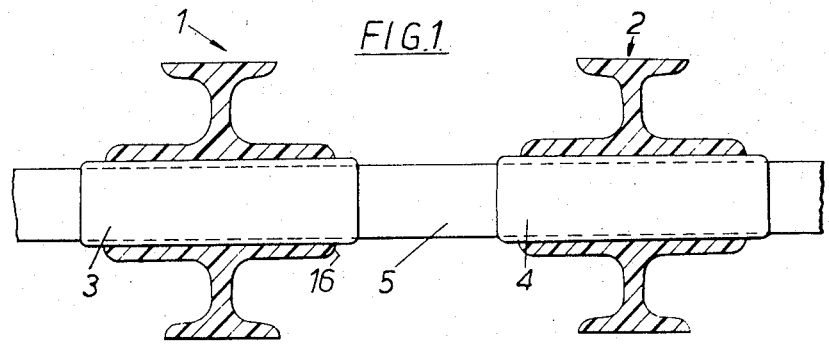
FIGS. 1 and 2 are longitudinal cross sections.

FIG. 1 shows two spacers 1 and 2 mounted on metal sleeves 3 and 4 which fit tightly onto to the inner conductor 5 of the tubular bus bar.

Figure 2:
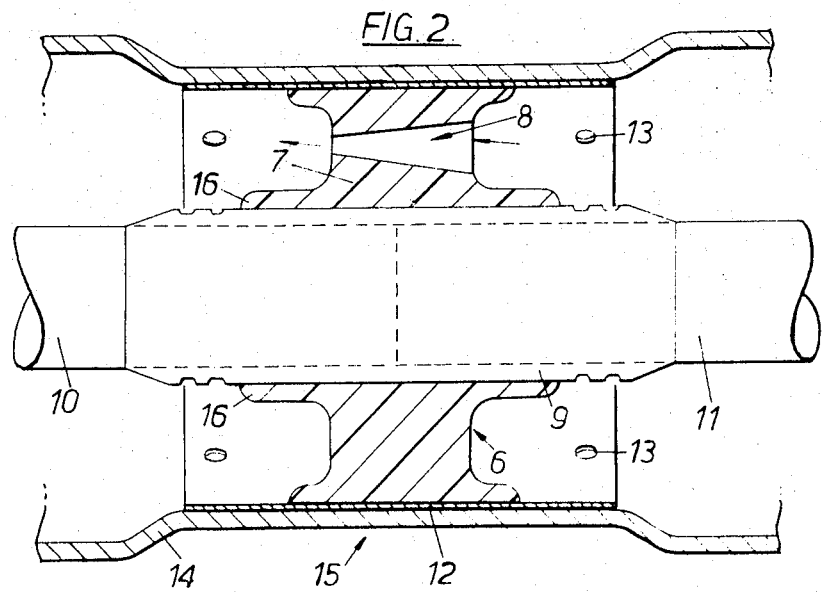

The spacer 6 shown in FIG. 2 is formed with a thicker web 7, apertured as at 8 to allow gas flow along the annular space in the direction of the arrows. In this case the spacer 6 is mounted on a tube 9 which is used as a connector for attaching together two lengths 10 and 11 of inner tubular conductor, by compression jointing, and is mounted in and bonded to a thin metallic sleeve 12 having apertures 13 in its projecting end parts for the purpose of equalizing pressure. The complete spacer unit is securely mounted in a tubular outer enclosure 14 by swaging down the enclosure as shown at 15.

Figure 3:
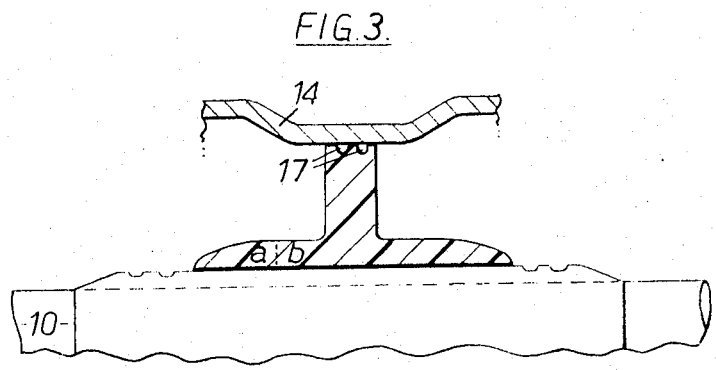
FIG. 3 is a scrap view showing a modification.

In FIGS. 1 and 2, each of the end parts 16 of the hubs of the spacers are shown as having in the plane of the drawing a cross section which is substantially a quandrant of a circle; alternatively it may be a quandrant of an ellipse having unequal axis $a, b$, with the major axis $a$ lying in the inner surface of the hub, as shown in FIG. 3, which also illustrates the use of stress grading by means of metallized grooves 17 in the peripheral surface of the spacer. In this preferred form, the outer tubular part of the spacer is omitted.

What we claim as our invention is:

1. In a gas-insulated bus bar installation suitable for transmitting electric power at a voltage of at least 22 kv. and a current of at least 1,000 comprising a tubular load-carrying conductor mounted coaxially within a tubular outer enclosure and spaced therefrom to define dielectric space containing an insulating gas, a plurality of supports mounting a length of said load-carrying conductor within the said outer enclosure each comprising a central hub which adheres to a metal surface that is electrically continuous with said tubular conductor said hub having a substantially circular cross section in very plane at right angles to the conductor axis characterized in that the hub has a cross section in any plane passing through the conductor axis that coincides at each end of the hub with an ellipse having its major axis lying on the inner surface of the hub and its minor axis lying on a radius of the conductor cross section and extending to substantially the maximum thickness of the end part of the hub.

2. An installation in accordance with claim 1 in which the major and minor axes of said ellipse are equal.

* * * * *